March 10, 1970     C. E. ATKINS     3,500,374

THREAD END DETECTOR

Filed April 11, 1967

INVENTOR
CARL E. ATKINS
BY Eyre, Mann & Lucas
ATTORNEYS

United States Patent Office 3,500,374
Patented Mar. 10, 1970

3,500,374
THREAD END DETECTOR
Carl E. Atkins, Montclair, N.J., assignor to Wagner Electric Corporation, a corporation of Delaware
Filed Apr. 11, 1967, Ser. No. 630,081
Int. Cl. G08b 21/00
U.S. Cl. 340—259                    8 Claims

ABSTRACT OF THE DISCLOSURE

The invention provides an electrical device which detects the passage of a short metalized conductive segment of a length of a thread adjacent to the end of the thread or to some other thread distance. When the conductive portion passes two sensing terminals, a circuit is completed and a semiconductor switch is activated, lighting an indicating lamp. The lamp remains lighted until the circuit and switch are normalized by depressing a switch button.

---

The invention relates to a circuit which can be triggered to light a lamp even though the thread is moving as fast as 500 feet per minute and the metalized portion is only ⅝ of an inch long. Sensing terminals of various types may be used and are set so that the metalized portion of the thread produces conduction between the terminals and thereby discharges a capacitor. The discharge current triggers a semiconductor switching circuit comprising two transistors. The switching circuit actuates a relay and turns on an indicating lamp. The circuit is powered by an alternating current supply.

Prior art thread end detectors have employed mechanical means for providing an indication that there is no more thread left on a reel or spool. These devices were not reliable and produced an indication only after the thread was entirely gone. The present invention gives an indication before the end is reached and can be used at any speed.

Figure 1:
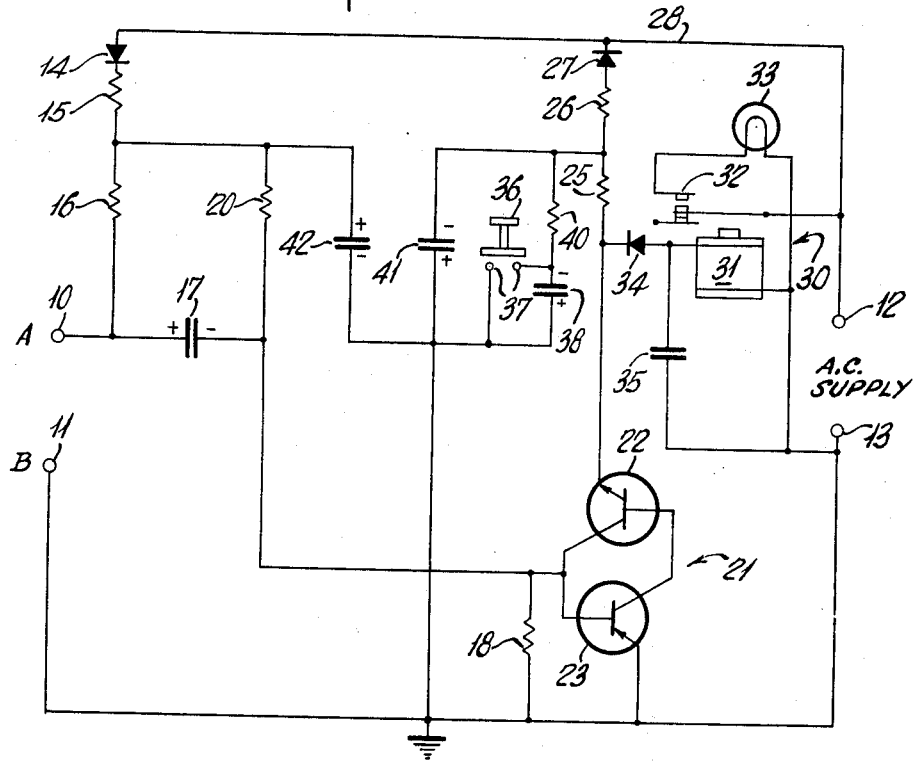
FIG. 1 is a schematic diagram of connections of the detecting circuit.

Referring now to FIG. 1, the sensing circuit includes two input terminals 10 and 11 which are to be connected to the sensing device terminals. Two supply terminals 12 and 13 are to be connected to a 115 volt alternating current power supply. A first rectifier circuit includes a diode 14, resistors 15 and 16, a small capacitor 17 and resistor 18. Another resistor 20 is connected across resistor 16 and capacitor 17 and acts to limit the charge on capacitor 17. A second capacitor 42 is added to act as a filtering component and absorb the A.C. parts of the rectified current.

A semiconductor switch 21 includes an NPN transistor 22 and a PNP transistor 23, each having its collector electrode connected to the base electrode of the other transistor. The emitter of transistor 23 is connected to a common conductor 24 which is also connected to terminals 11 and 13 and may be grounded. The emitter of transistor 22 is connected in series with resistors 25 and 26 and diode 27 to the other power conductor 28 and supply terminal 12. This circuit provides a negative potential for the semiconductor switch 21 but it does not conduct when the circuit is first connected to the power supply because the base electrode of transistor 23 is biased by a positive voltage drop across resistor 18, connected through resistors 20 and 15 to diode 14.

A relay 30, including a winding 31 and contacts 32 is coupled between switch 21 and an indicator lamp 33. The winding 31 is connected across switch 21 in series with a diode 34. The winding 31 is shunted by a large capacitor 35 to prevent chattering of the contacts and to keep the relay actuated during the positive portions of the A.C. wave.

A normalizing circuit is provided for turning out the lamp, opening the switch 21 to make it non-conductive, and to restore the other parts of the circuit to their original conditions. The normalizing circuit includes a manually operable push button 36 which closes contacts 37, discharges capacitor 38, and connects a shunt circuit around the semiconductor switch 21. This shunt circuit includes a resistor 40 and a capacitor 41. Another capacitor 42 is connected around resistors 20 and 18 so that it discharges through resistor 16 when terminals 10 and 11 are shorted and then reduces the positive potentials provided by diode 14 when terminals 10 and 11 are disconnected and the capacitor 42 charges again.

Figure 2:
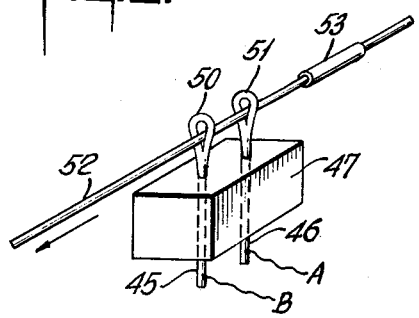
FIG. 2 is a perspective view of one form of thread sensing device, showing a portion of the thread with a short metalized coating.

FIG. 2 shows one arrangement of a sensing device for connecting terminals 10 and 11. Pins 45 and 46 are secured to an insulator block 47 with connecting conductors which run to terminals 10 and 11. The upper ends of the pins are provided with "eyes" or perforations 50 and 51 and the thread 52 passes through them. A metalized portion 53 on thread 52 is made long enough so that an electrical connection is made between the two pins when the portion 53 is drawn through the eyes 50 and 51.

Figure 3:
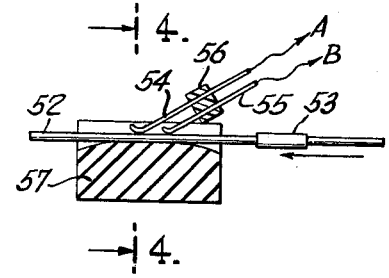
FIG. 3 is a cross sectional view of an alternate form of sensing device taken along line 3—3 of FIG. 4.
Figure 4:
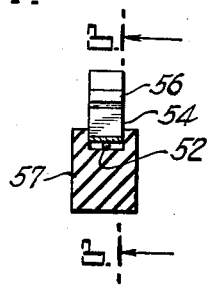
FIG. 4 is a cross sectional view of the sensing device shown in FIG. 3 and is taken along line 4—4 of that figure.

FIGS. 3 and 4 show an alternate arrangement of sensing pins 54 and 55 secured to an insulator 56. The pins are in the shape of flat resilient springs, the ends of which rest on the thread 52 supported by an insulator block 57.

The operation of the circuit shown in FIG. 1 is as follows: when the A.C. power supply is first connected to terminals 12, 13, the current through diode 14 charges capacitors 17 and 42 as indicated in the drawing. Current through diode 27 charges capacitors 38 and 41 as indicated and also provides unidirectional pulses which pass through diode 34 and relay winding 31 to attract the armature and open contacts 32. The lamp 33 is not lighted. Switch 21 is non-conductive because of the positive bias furnished by the potential drop across resistor 18.

Now, let it be assumed that terminals 10 and 11 are connected, either by the metalized portion 53 or by some other means. Capacitor 17 discharges through resistor 18 and thereby lowers the potential of the base of transistor 23 making it conductive. Current flows through the base electrode to the emitter thereby applying a negative potenial to the base of transistor 22 making it conductive. Current now flows from diode 27 through resistors 26 and 25 and then through both transistors 22 and 23, the potential drops through them maintaining conduction even though the potential drop across resistor 18 is again made positive.

Conduction through the double transistor switch 21 shunts the relay winding 31 and reduces its current so that the armature is restored to its normal position and contacts 32 are closed. This completes a circuit from the supply terminals 12, 13 to the lamp and the lamp is lighted. Other indicators such as bells or buzzers may be used instead of a lamp.

When the condition of the circuit has been noted and when a new spool of thread has been installed, the operator depresses button 36 to normalize the circuit. Button 36 connects contacts 37 and discharges capacitor 38. Capacitor 41 is also discharged through resistor 40, this discharge pulse applying a positive potential to the emitter electrode of transistor 22 and stopping the current flow through the switch 21. This positive pulse is prevented from entering the relay winding 31 by diode 34. With the switch 21 non-conductive, negative current pulses again flow through the relay winding, attracting the armature and opening contacts 32. The entire circuit has now been normalized.

In one embodiment of the circuit shown in FIG. 1, the following circuit values were used:

Resistors:
    16—10 megohms
    20—3.3 megohms
    40 and 25—8,200 ohms
    18—100,000 ohms Capacitors:
    17—25 picofarads
    42—.1 microfarad
    41—.33 microfarad

What is claimed is:

1. A circuit for detecting a change of conductivity in a length of moving material comprising: a pair of conductive terminals in contact with the material to determine its conductivity state; a semiconductor latching switch, normally nonconductive, having a firing electrode for activating the switch to conduct whenever a predetermined pulse is received; a coupling circuit connected between the conductive terminals and said switch for applying an actuating pulse to the switch whenever the conductive terminals are connected to each other by a conductive segment of the length of material; a pair of supply terminals for connection to an alternating current power supply; a first rectifier connected to one of said supply terminals for supplying positive pulses to one of said conductive terminals and to the firing electrode of the switch; a second rectifier also connected to one of said supply terminals for supplying negative pulses to the switch; a relay having a pair of contacts and a winding coupled in parallel with the switch for actuation when the switch is made non-conductive and for normalizing when the switch is made conductive; and a load circuit coupled to the relay contacts for providing an indication when the switch is made conductive.

2. A circuit as claimed in claim 1 wherein a manual reset circuit is provided for normalizing all the circuit components, said circuit including a pair of normally open reset contacts connected across the firing electrode and a source of potential, a normally charged capacitor connected in parallel with a resistor and the switch for applying a positive potential to the switch when the reset contacts are closed.

3. A circuit as claimed in claim 1 wherein said length of moving material is a normally non-conductive thread having a segment of conductive material.

4. A circuit as claimed in claim 1 wherein said semiconductor switch includes a PNP transistor and an NPN transistor, each having a base, an emitter, and a collector electrode; each transistor having its base electrode connected to the other collector electrode.

5. A circuit as claimed in claim 1 wherein said relay winding is connected in series with a diode rectifier and in parallel with a capacitor.

6. A circuit as claimed in claim 1 wherein the conductive terminals in contact with the moving material are formed with eyes through which the material passes.

7. A circuit as claimed in claim 1 wherein the conductive terminals are resilient flat conductors, the ends of which are in contact with the moving material.

8. A circuit as claimed in claim 1 wherein said load circuit includes a lamp which provides a visual signal when the relay contacts are closed.

References Cited

UNITED STATES PATENTS

| | | | |
|---|---|---|---|
| 2,942,248 | 6/1960 | Huggins | 340—259 |
| 3,052,878 | 9/1962 | Berry | 340—259 X |
| 3,260,063 | 7/1966 | Johnson | 340—213.1 X |
| 3,316,760 | 5/1967 | Ward | 340—259 |

JOHN W. CALDWELL, Primary Examiner

PERRY PALAN, Assistant Examiner